United States Patent [19]
Kim

[11] Patent Number: 5,739,608
[45] Date of Patent: Apr. 14, 1998

[54] ACTUATOR FOR OPTICAL PICKUP

[75] Inventor: Eun-goo Kim, Suwon, Rep. of Korea

[73] Assignee: Samsung Electronics Co., Ltd., Kyungki-Do, Rep. of Korea

[21] Appl. No.: 780,213

[22] Filed: Jan. 8, 1997

[30] Foreign Application Priority Data

Jan. 9, 1996 [KR] Rep. of Korea ................. 1996-311

[51] Int. Cl.$^6$ .................................................. H02K 7/09
[52] U.S. Cl. ...................... 310/90.5; 359/814; 359/824; 369/44.22
[58] Field of Search .................. 310/90.5; 359/813, 359/814, 822, 823, 824; 369/44.11, 44.17, 44.22

[56] References Cited

U.S. PATENT DOCUMENTS 5,506,732  4/1996  Mori ........................................ 359/824

Primary Examiner—Michael L. Gellner
Assistant Examiner—Raymond Barrera
Attorney, Agent, or Firm—Sughrue, Mion, Zinn, Macpeak & Seas, PLLC

[57] ABSTRACT

An actuator for an optical pickup includes a first permanent magnet for supporting an objective lens. A focusing coil is wound around the circumference of the first permanent magnet for providing a driving force for vertical movement of the first permanent magnet. A plurality of tracking coils are placed at predetermined portions of the circumference of the first permanent magnet and provide a driving force for lateral movement of the first permanent magnet. A second permanent magnet is installed around the first permanent magnet and is separated from the first permanent magnet by a predetermined distance, for levitating the first permanent magnet which has the objective lens and the focusing and tracking coils disposed thereon, by interacting with the first permanent magnet. Therefore, the objective lens is supported by a magnetic levitation method and the disadvantages of a complicated bobbin assembly and difficulties in manufacturing and assembling the actuator can be avoided, further increasing the manufacturing productivity of the actuator.

5 Claims, 3 Drawing Sheets

ACTUATOR FOR OPTICAL PICKUP

BACKGROUND OF THE INVENTION

The present invention relates to an actuator for an optical pickup used for an optical information processor such as a CD-ROM drive and, more particularly, to an actuator for an optical pickup having a simple bobbin for supporting an objective lens.

An optical pickup is for reading information from a disk loaded on an optical information processor such as a CD-ROM drive or a compact disk player (CDP). The optical pickup includes an objective lens for focusing a light beam emitted from a light source to the surface of a disk and an actuator for accurately locating the focus of the objective lens on a target position of the disk by moving the objective lens in lateral and vertical directions with respect to the surface of the disk.

FIGS. 1A and 1B show a conventional actuator for an optical pickup, in which FIG. 1A is a plan view where a holder and a suspension are separated, and FIG. 1B is a plan view where the holder and the suspension are coupled.

Referring to FIGS. 1A and 1B, a conventional actuator 100 for an optical pickup includes a bobbin 102 on which an objective lens 101 is mounted, suspensions 107 and 107' for supporting the bobbin 102, a holder 106 for holding the suspensions 107 and 107', a tracking coil 103 and a focusing coil 104 for driving the bobbin 102 in lateral and vertical directions, respectively, by interacting with a permanent magnet (not shown), and a flat printed circuit board (FPCB) 105 for applying current to the tracking and focusing coils 103 and 104 via the suspensions 107 and 107'.

However, the conventional actuator 100 having the above structure supports a bobbin assembly including the bobbin 102 and the objective lens 101 by a mechanical suspension method, that is, by a wire or a plate spring. Thus, the assembly for the bobbin 102 is complicated and it is difficult to manufacture and assemble the actuator.

SUMMARY OF THE INVENTION

To solve the above problems, it is an object of the present invention to provide an actuator for an optical pickup having a simple bobbin assembly, which can easily be manufactured and assembled due to the simple structure of the bobbin assembly.

To achieve the above object, there is provided an actuator for an optical pickup, comprising: a first permanent magnet which supports an objective lens; a focusing coil wound around a circumference of the first permanent magnet and which provides a driving force for vertical movement of the first permanent magnet; a plurality of tracking coils placed at predetermined portions of the circumference of the first permanent magnet and which provide a driving force for lateral movement of the first permanent magnet; and a second permanent magnet installed around the first permanent magnet and being separated from the first permanent magnet by a predetermined distance, for levitating or floating the first permanent magnet which has the objective lens and the focusing and tracking coils disposed thereon, by interacting with the first permanent magnet.

The actuator of the present invention supports the objective lens by a magnetic levitation method, not by the conventional mechanical suspension method, so that the disadvantages of a complicated bobbin assembly and difficulties in the manufacturing and assembling the actuator can be avoided.

BRIEF DESCRIPTION OF THE DRAWINGS

The above object and advantages of the present invention will become more apparent by describing in detail a preferred embodiment thereof with reference to the accompanying drawings, in which.

DETAILED DESCRIPTION OF THE INVENTION

Figure 1B:
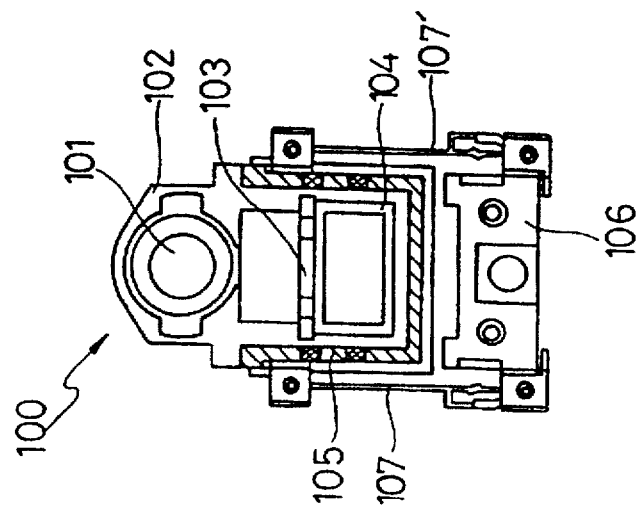
FIG. 1B is a plan view showing the structure of the conventional actuator for the optical pickup in which the holder and the suspension are coupled.
Figure 1A:
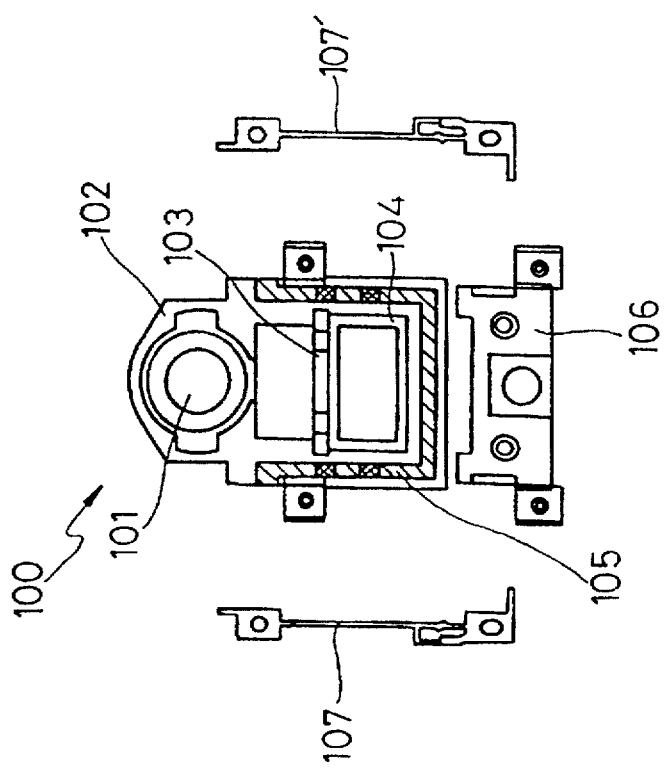
FIG. 1A is a plan view showing the structure of a conventional actuator for an optical pickup in which a holder and a suspension are separated.
Figure 2:
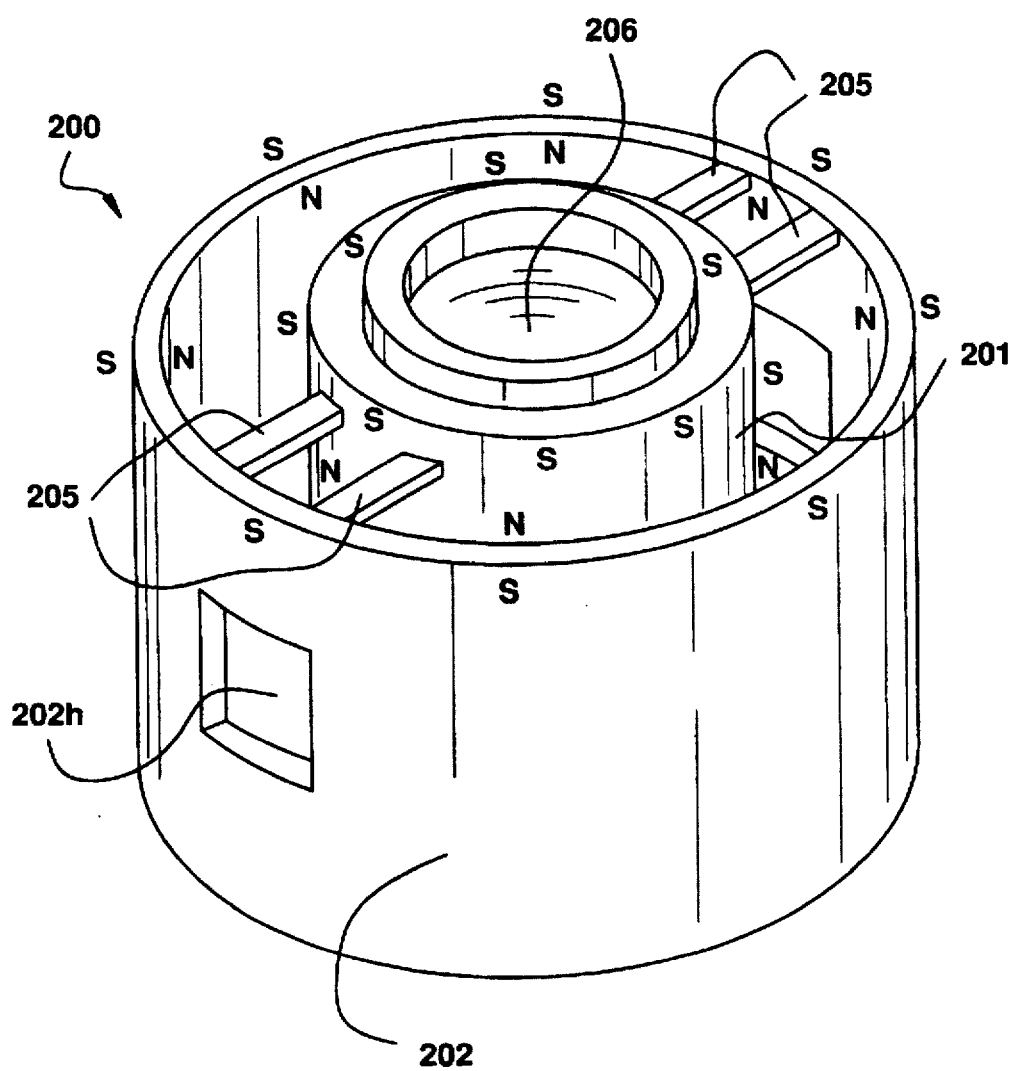
FIG. 2 is a perspective view schematically illustrating the structure of an actuator for an optical pickup according to the present invention.

Referring to FIG. 2, in an actuator 200 for an optical pickup of the present invention, a cylindrical first permanent magnet 201 with a predetermined diameter for supporting an objective lens 206 is located at the center of the actuator 200, and a cylindrical second permanent magnet 202 having a larger diameter than the first permanent magnet 201 is installed around the first permanent magnet 201 being separated by a predetermined distance. Preferably, the first permanent magnet 201 is made of a material that is as light as possible and enables generation of a strong magnetic force, in order to levitate or float the first permanent magnet 201 by the magnetic force between the first and second permanent magnets 201 and 202. According to the present embodiment, while the cylindrical first and second permanent magnets 201 and 202 are used, the permanent magnets are not limited to a cylindrical shape. That is, each permanent magnet may have a rectangular or polygonal shape.

Also, a damping device 205 is installed between the first and second permanent magnets 201 and 202. The damping device 205 controls movement range and oscillations of the first permanent magnet 201 and functions as a connection for supplying current to focusing and tracking coils 203 and 204 shown in FIG. 3C. In this case, a plurality of wires or leaf springs may be used as the damping device 205.

Figure 3A:
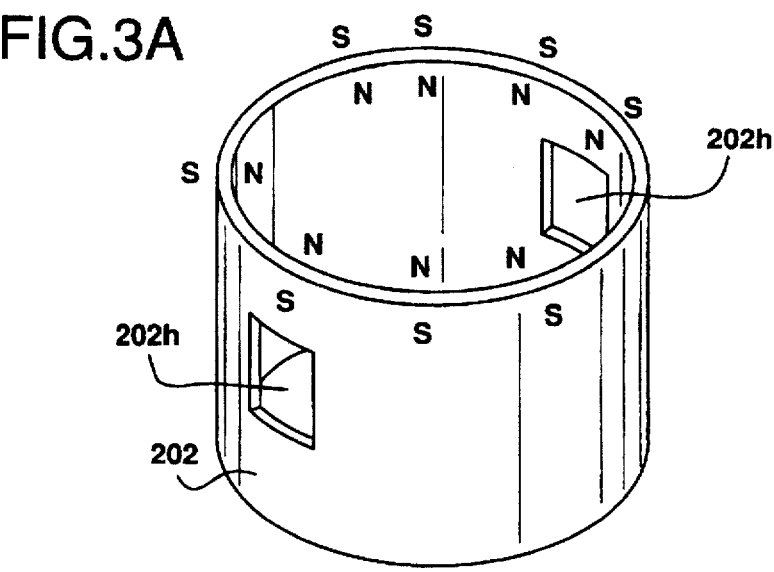
FIG. 3A is a perspective view showing only a second permanent magnet of the actuator for the optical pickup according to the present invention.
Figure 3B:
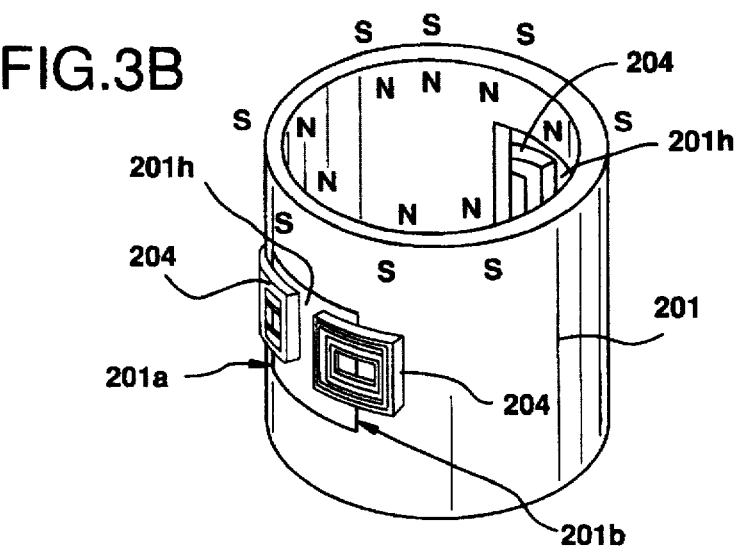
FIG. 3B is a perspective view showing the arrangement of a first permanent magnet and the tracking coils placed at the circumference of the first permanent magnet in the actuator for the optical pickup according to the present invention.

On the other hand, as shown in FIGS. 3A and 3B, two through-holes 201h and 202h are formed respectively at predetermined portions of the cylindrical bodies of the first and second permanent magnets 201 and 202, for lateral movement (tracking movement) of the first permanent magnet 201. The two respective through-holes 201h and 202h are symmetrically formed at both end portions of the diameter of each cylindrical body. Since the magnetic force by the first and second permanent magnets 201 and 202 cannot operate at the through-holes 201h and 202h, a path of the magnetic line of force is provided by the tracking coils 204 through the through-holes 201b and 202h.

Figure 3C:
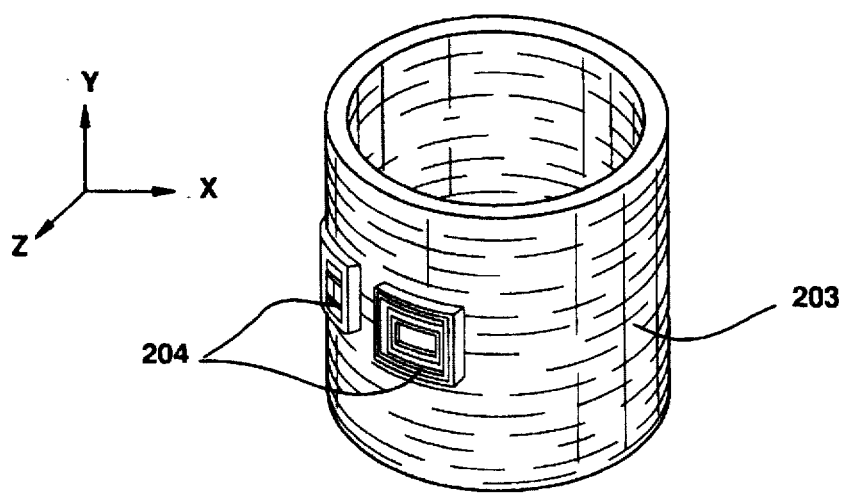
FIG. 3C is a perspective view showing the windings of the focusing and tracking coils at the circumference of the first permanent magnet in the actuator for the optical pickup of the present invention.

As shown in FIG. 3C, the focusing coil 203 for providing a driving force for vertical movement of the first permanent magnet 201 is wound around the circumference of the first permanent magnet 201 and each of the tracking coils 204 for providing a driving force for the lateral movement thereof are provided at the circumference thereof. The centers of the wound tracking coils 204 are located at sides 201a and 201b of the through-holes 201h formed at the first permanent magnet 201 as shown in FIG. 3B and a total of four tracking coils are provided to the respective through-holes 201h, two at each hole. In this case, generally, the tracking coils 204 are fixed by an adhesive. The tracking coils 204 may be fixed by a string.

Now, the operation of the actuator having the above structure for the optical pickup according to the present invention will be described.

When current is not applied to the focusing coil 203 and the tracking coils 204, the first permanent magnet 201 is levitated or floated having the same vertical central axis as the second permanent magnet 202 by the interaction of the magnetic forces between the first and second permanent magnets 201 and 202.

The principle of the above magnetic levitation will be described in detail.

Assuming that the sum of masses of the first permanent magnet 201, the focusing and tracking coils 203 and 204 wound around the first permanent magnet 201, and the objective lens 206 installed on the first permanent magnet 201 is $m_1$, a gravitational force $F_g$ acting on $m_1$ can be expressed as $F_g = m_1 g$, where g is the gravitational acceleration. Meanwhile, if it is assumed that the magnetic force acting between the first and second permanent magnets 201 and 202 is Fm, the condition of $F_m \geq F_g$ should be satisfied for levitating $m_1$. Thus, for satisfying the above relation, $m_1$ and $F_g$ are first obtained by an experimentation and $F_m$ is then inferred based on the obtained $m_1$ and $F_g$, thereby selecting permanent magnets emitting magnetic flux sufficient to satisfy $F_m$. Accordingly, the first permanent magnet 201, more particularly, an assembly of the mass $m_1$, becomes levitated.

When current is applied under the above levitation state, the first permanent magnet 201 ascends or descends in the vertical (Y-axis) direction by the interaction of the magnetic fields formed by the focusing coil 203 and the second permanent magnet 202. The ascending or descending of the first permanent magnet 201 is dependent on the direction of current flowing through the focusing coil 203. Thus, focusing of the objective lens 206 mounted on the first permanent magnet 201 can be controlled by properly changing the current flow direction.

On the other hand, when current is applied to the tracking coils 204, the first permanent magnet 201 moves in the lateral (X-axis) direction by the interaction of the magnetic fields formed by the tracking coils 204 and the second permanent magnet 202. Here, the lateral movement of the first permanent magnet 201 is possible because the wires or leaf springs forming the damping device 205 are flexible enough to permit lateral movement and dependent on the direction of current flowing through the tracking coils 204 as in the case of the focusing coil 203. Thus, the tracking of the objective lens 206 mounted on the first permanent magnet 201 can be controlled by properly changing the direction of current flowing through the tracking coils 204.

As described above, since the actuator of the optical pickup according to the present invention supports the objective lens by a magnetic levitation method, and not by the conventional mechanical suspension method, the conventional disadvantages of a complicated bobbin assembly and difficulties in the manufacturing and assembling the actuator can be avoided. Therefore, the actuator can be manufactured more efficiently.

It is contemplated that numerous modifications may be made to the actuator for optical pickup of the present invention without departing from the spirit and scope of the invention as defined in the following claims.

What is claimed is:

1. An actuator for an optical pickup, comprising:
   a first permanent magnet which supports an objective lens;
   a focusing coil wound around a circumference of said first permanent magnet and which provides a driving force for vertical movement of said first permanent magnet;
   a plurality of tracking coils placed at predetermined portions of the circumference of said first permanent magnet and which provide a driving force for lateral movement of said first permanent magnet; and
   a second permanent magnet installed around said first permanent magnet and being separated from said first permanent magnet by a predetermined distance, for levitating said first permanent magnet which has said objective lens and said focusing and tracking coils disposed thereon, by interacting with said first permanent magnet.

2. The actuator for an optical pickup as claimed in claim 1, further comprising a damping device for controlling the range of movement and oscillations of said first permanent magnet and applying current to said focusing coil and said tracking coils is installed between said first and second permanent magnets.

3. The actuator for an optical pickup as claimed in claim 1, wherein two through-holes which provide a magnetic path of said tracking coils are formed at predetermined portions of said first and second permanent magnets, respectively.

4. The actuator for an optical pickup as claimed in claim 3, wherein said through-holes are symmetrically formed at both ends of a horizontal axis of said first and second permanent magnets, said horizontal axis crossing a vertical axis of said first and second permanent magnets.

5. The actuator for an optical pickup as claimed in claim 4, wherein each of said tracking coils has a center which is located at a vertical side of a corresponding one of said through-holes.

* * * * *